Dec. 22, 1964 H. ZIMMERMANN 3,162,450

RECORD PLAYERS CUT-OUT DEVICES

Filed Sept. 20, 1960

INVENTOR

HEINRICH ZIMMERMANN

Otto John Munz,

ATTORNEY 3,162,450

RECORD PLAYERS CUT-OUT DEVICES

Heinrich Zimmermann, St. Georgen, Black Forest, Germany, assignor to Oskar Steidinger and Siegfried Steidinger, trading as the firm Gebrueder Steidinger Filed Sept. 20, 1960, Ser. No. 57,215
Claims priority, application Germany, Sept. 24, 1959, St 15,611
8 Claims. (Cl. 274—23)

The present invention concerns a cut-out or switching off device for record players.

The cut-out device of single and multiple record players is actuated in most cases by the pick-up. The switching force obtainable therefrom depends upon its weight. Modern pick-ups require comparatively small suporting forces for scanning the record, with the result that the switching forces obtainable are so diminished that a proportion of the switching devices no longer operates reliably.

To solve the cut-out problem the pick-up of a known device is fitted with a magnetically conducting armature which, as soon as the pick-up approaches the run-out groove of the record, moves into range of a fixedly arranged magnet by means of which the scanning needle is drawn with increased pressure into the groove to ensure the cut-out. This causes increased wear and tear of the needle and of the record.

In a further known device the vertical pivotal axis of the pick-up has a magnet fixed thereon which, as soon as it has been swung about through a certain angle, attracts an armature arranged on the contact spring of the motor switch. This device is adapted to respond only to a predetermined swinging angle of the pick-up and makes it possible for the needle to be ripped out of the groove by the magnet practically as soon as the swinging angle has been reached. Moreover it does not permit the pick-up to be swung out of range of the record without the motor and/or the turntable being set in motion.

Both devices moreover have the disadvantage that it is not possible to fulfill two essential operational requirements simultaneously therewith. These are the automatic return of the pick-up at the end of playing a single record or of the last record of a stack and the possibility of placing the pick-up manually in position without having to switch on the record player by means of a separate handle and/or having first to switch in a switching movement.

The invention is designed for a record player in which the pick-up at the end of playing a single record or the last record of a stack automatically returns to its rest which is connected with a switch for the motor circuit, thus causing the switch to open. The switching force resulting from the supporting pressure of the pick-up on the record is comparatively small, thus causing the switch to be very susceptible to trouble. In accordance with one of the known designs the contacts are in fact pressed together by means of a magnet. Hence, despite the comparatively slow lowering movement of the pick-up, omitting a separate spring mechanism, it is possible to obtain a quick opening of the contacts, the effective energy, however, is not increased thereby.

An apparatus for the increase of the supporting force of a pick-up with supporting roller adapted to scan the size of record is known which, by means of the pick-up lifting bar cancels the action of the discharging spring. This apparatus is adapted to be used only when the pick-up has a dead weight which lies by a considerable amount above the required supporting force for the scanning needle. Moreover, this apparatus is dependent upon the existence of an automatic control mechanism.

It is also known to retain a pick-up by means of a magnet on its support to secure it against being accidentally swung about by manual contact or while being carried.

The invention is based on the problem of utilizing the force of a magnet to switch off a record player whilst obviating the disadvantages hitherto existing in cut-out devices.

According to the present invention an armature and/or a magnet is arranged in the pick-up opposite a magnet and/or armature arranged in the region of the pick-up support.

A further preferred feature of the invention consists in the fact that the magnet or the armature is connected with the switch disposed in the pick-up rest. A comparatively high opening speed of the switch is hereby obtained.

The invention will be described further, by way of example, with reference to the accompanying drawings, in which—

Figures 1, 2:
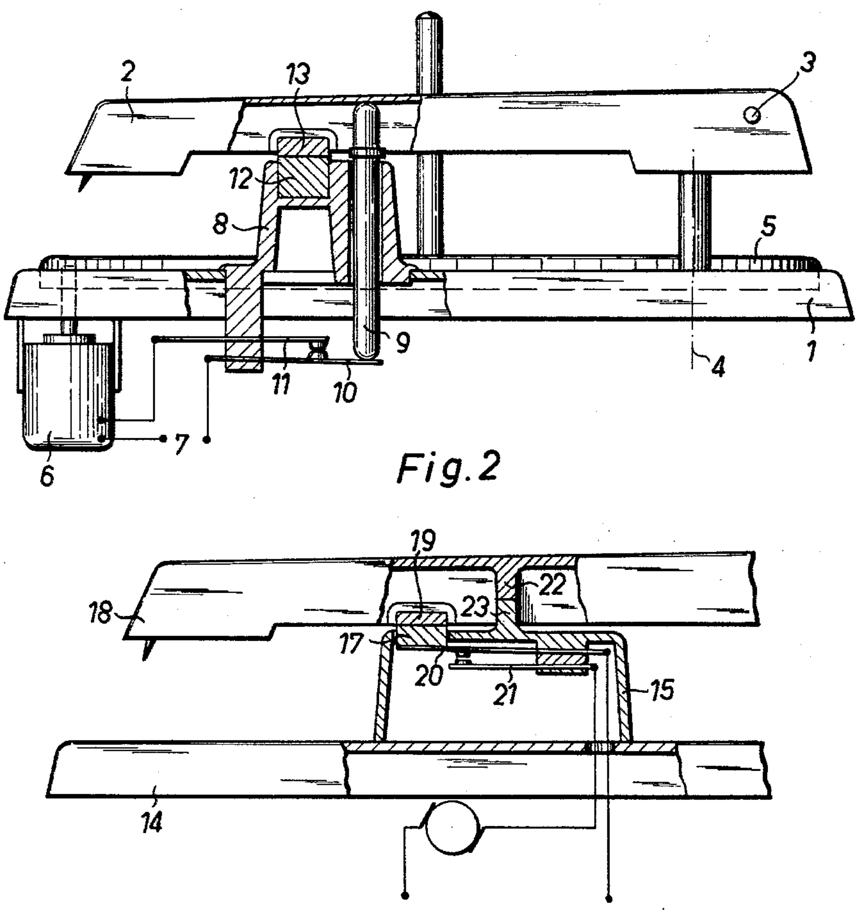
FIG. 1 is a sectional side elevation, of a record player with a sectional view of the pick-up rest switch.
FIG. 2 is a cross section through a pick-up rest switch of an alternative design.

As shown in FIG. 1 a pick-up or tone arm 2 is mounted on a base plate 1 and adapted to be pivoted about a horizontal axis 3 and about a vertical axis 4. A turntable 5 is driven by means of an electric motor 6 which is supplied from the mains 7. A push rod 9 is mounted so as to be vertically displaced in a pick-up rest or support 8 fitted on the base plate 1. This push rod is supported on a contact spring 10. The contact spring 10 is so dimensioned that it is capable of lifting the push rod or plunger 9 alone and is lifted in turn to such an extent until it connects the electric motor 6 with the mains 7 via the contact spring 11. The pick-up rest 8 moreover has a permanent magnet 12 fitted therein and the pick-up 2 fitted with the associated armature 13 thereto. If the pick-up 2 is placed on the rest 8 by the pick-up control mechanism, when the armature 13 approaches the magnet 12, the pick-up is drawn with a force additional to its dead weight against its rest 8 and the push rod 9 forced with increased pressure against the contact spring 10 to open the circuit. The magnet increases the separating speed of the contacts. In place of a single leaf spring for the switch it is also possible to use a known spring contact switch. The fixed arrangement of the magnet 12 on the base plate provides the advantage that a guaranteed switch can be used.

As shown in FIG. 2 a pick-up rest or support 15 is mounted on a base plate 14. The housing of the pick-up rest 15 has a contact spring 20, a magnet 17 and in the pick-up 18 the associated armature 19 mounted therein. The contact spring 20 is so pre-tensioned that, when the pick-up 18 is not near its pick-up rest 15, it closes the motor circuit via the contact spring 21. When the pick-up 18 is lowered on to its support, until the stops 22 and 23 make contact with one another, the magnet 17 is lifted up to the contact against the armature 19 and the motor circuit is broken.

Figure 3:
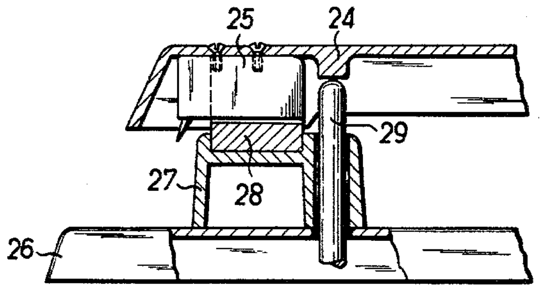
FIG. 3 a cross-section through a pick-up head and the rest thereof.

As shown in FIG. 3 the head of a pick-up 24 contains a magnetic pick-up unit 25. A pick-up rest or support 27 in which an armature 28 is disposed is mounted on a base plate 26. A push rod 29 is mounted in the rest 27 so as to be vertically displaceable and is connected with the switch for the motor current in a manner not shown in the drawings. This device operates in a similar manner to that of the example illustrated in FIG. 1. It differs therefrom merely by the fact that no additional magnet is required.

I claim:

1. A control for a record player, comprising, a base, a turntable journaled on said base for rotation about a fixed, vertical first axis, a tone arm support fixed with said base in horizontally-offset relation with said turntable, a tone arm, having a first end mounted to said base for pivoting about second and third, respectively, vertical and horizontal axes, whereby the distal end of said tone arm may move from a first position resting on said support, to a second position for traverse over and across said turntable, a motor connected to rotate said turntable, a circuit for energizing said motor including a normally-closed switch carried by said support, first means carried by said support and operated only by and in response to a predetermined vertical force between the distal end of said tone arm and support, to open said switch, and magnet and armature means carried by said tone arm and said support and coacting only when said tone arm is in its said first position, to exert said predetermined vertical force upon said first means.

2. In a motor control for a record player, a base, a turntable journaled on said base for rotation on a vertical axis, a tone arm, means pivotally mounting said tone arm on said base for movement from a first, off-record position to a second position in playing relation on and over a record on said turntable, a support fixed with said base and on which said arm rests in first position, a motor connected to rotate said turntable, a circuit for energizing said motor and including first and second normally-closed contacts carried by said support, and magnet and armature means carried by said arm and support and effective only when said arm is in its said first position, to effect a vertical force directly on one said contact to move the same out of engagement with the other said contact.

3. In a control for a record player, a base, a turntable journaled on said base for rotation about a first vertical axis fixed therewith, a tone arm support, fixed with said base at one side of said turntable, a tone arm, means mounting a first end of said arm on said base, in offset relation with said turntable, for pivoting about second and third, respectively vertical and horizontal axes, from a first position wherein the second end of said arm rests on said support, to a second position wherein said second end may move in operative traverse over and across said turntable, a motor carried by said base and connected to rotate said turntable, a circuit for energizing said motor and including first and second separable, normally-closed contacts, carried by said support, first and second parts carried respectively by said support and arm, one said part being a magnet and the other said part being an armature, said parts cooperating when said arm is in first position only, to effect a vertical force between said support and arm about said third axis, and means responsive to said force, separating said contacts.

4. The control of claim 3, a horizontally-disposed spring arm having one end fixed with said base, said first contact being carried by said spring arm adjacent the distal end thereof, and urged by resilience thereof into engagement with said second contact, a vertical plunger mounted in said support with its lower end in contact with the distal end of said spring arm, for translation from a first upper position wherein said contacts are closed, to a second lower position wherein said first contact is moved by said plunger, out of engagement with said second contact, said tone arm when in first position, engaging the upper end of said plunger to urge the same to second position, the sum of said vertical force and the weight of said arm in first position being just sufficient to depress said plunger to its said second position against the resilience of said spring arm.

5. A control for a record player, comprising, a base, a turntable journaled on said base for rotation about a vertical first axis fixed therewith, a tone arm support fixed with said base at one side of said turntable, a tone arm, means mounting a first end of said arm on said base, in offset relation with said turntable, for pivoting about second and third respectively vertical and horizontal axes from a first position wherein the distal end of said arm rests on said support, to a second position wherein said distal end may move in operative traverse over and across said turntable, a motor carried by said base and connected to rotate said turntable, a circuit for said motor, including first and second separable, normally-closed contacts carried by said support, an armature fixed to said support, a magnet fixed to said arm adjacent the distal end thereof, said magnet and armature cooperating to effect a vertical force between said arm and support about said third axis when said arm is in first position, and means operated only by said force to move said contacts out of engagement to open said circuit.

6. A record-player control, comprising, a base, a turntable journaled on said base for rotation about a first vertical axis fixed with said base, a tone arm support fixed with said base in horizontally-offset relation with respect to said turntable, a tone arm, having one end mounted on said base in offset relation with said turntable, for pivoting about second and third, respectively vertical and horizontal axes, from a first position wherein the second; distal end of said tone arm rests on said support, to a second position for traverse over and across said turntable, a motor carried by said base and connected to said turntable to rotate the same, a circuit connected with said motor to energize the same, said circuit including first and second normally-closed contacts carried by said support, magnet means connected with said first contact and constructed and arranged to separate said contacts by and in response to a predetermined upward force thereon, and an armature carried by said tone arm adjacent the distal end thereof and cooperating with said magnet means to exert said predetermined force thereon, only when the distal end of said tone arm is in first position.

7. In a control for a record player, a base, a turntable journaled on said base for rotation about a first vertical axis fixed with said base, a tone arm support fixed with said base in horizontally-offset relation with said turntable, a tone arm, means mounting a first end of said tone arm on said base, in offset relation with said turntable, for pivoting about second and third, respectively vertical and horizontal axes, from a first position wherein the distal end of said arm rests on said support, to a second position in record-playing relation with a record on said turntable, a horizontally-disposed spring arm, having one end fixed to said support, a magnet fixed to the distal end of said spring arm, a first electrical contact fixed with said spring arm adjacent said magnet, a second contact mounted below and normally in engagement with said first contact, a motor mounted in fixed relation with said base and connected to rotate said turntable, a circuit for energizing said motor and including said first and second contacts, and an armature fixed to said tone arm adjacent the distal end thereof and constructed and arranged to effect a vertical force on said magnet and spring arm, only when said tone arm is in its said first position, said force being just sufficient to separate said contacts.

8. A record-player control, comprising, a base, a turntable journaled on said base, for rotation about a first fixed vertical axis, a tone arm support fixed with said base in horizontally-offset relation wtih respect to said turntable, a tone arm having one end mounted on said base in offset relation with said turntable, for pivoting about second and third, respectively vertical and horizontal axes, from a first position wherein the distal end of said tone arm rests on said support, to a second position for pivotal movement over and across said turntable, a horizontal spring arm having one end fixed to said support, a first contact carried by said spring arm at the distal end thereof, a second contact carried by said support and normally in engagement with said first contact under resilience of said spring arm, a vertical plunger mounted in said support and having its lower end in contact with and resting upon, the distal end of said spring arm, said plunger being vertically translatable from a first upper position wherein said contacts are closed, and a second lower position moving said spring arm to separate said contacts in response only to a predetermined downward force on the upper end of said plunger, said tone arm when in first position engaging the upper end of said plunger to urge the same to first position, first and second parts fixedly carried respectively by the distal end of said tone arm and said support, one said part being a magnet, the other said part being an armature, said parts being contiguous and coacting, when said tone arm is in first position only, to effect said predetermined force on said plunger, a motor connected to said turntable to rotate the same, and a circuit connected with said motor to energize the same and including said first and second contacts, in series.

References Cited by the Examiner

UNITED STATES PATENTS

| | | | |
|---|---|---|---|
| 1,915,906 | 6/33 | Thomas | 274—23.2 |
| 2,324,214 | 7/43 | Kellog | 274—1 |
| 2,596,016 | 5/52 | Falk | 274—1 |

FOREIGN PATENTS

| | | |
|---|---|---|
| 534,673 | 9/31 | Germany. |

NORTON ANSHER, *Primary Examiner.*

STEPHEN W. CAPELLI, JOHN P. WILDMAN, *Examiners.*